Patented Sept. 18, 1951

2,567,924

UNITED STATES PATENT OFFICE 2,567,924

WOOD FILLER COMPOSITION

Edward R. Bush, Lemont, Ill., and John E. Hanle, Westfield, N. J., assignors to Interchemical Corporation, New York, N. Y., a corporation of Ohio No Drawing. Application January 9, 1947, Serial No. 721,161

5 Claims. (Cl. 260—19)

This invention relates to improved wood filler compositions for filling the pores of the wood which is later to be coated with a finishing coating.

In the past, wood fillers have generally consisted of very highly pigmented oils or oleoresinous varnishes. In conventional practice, these filler compositions are applied to the wood surface by spraying or brushing. Then the surface is wiped with a cloth to remove excess filler and the wiped surface is dried, by baking or air-drying, before the finish coat of lacquer or varnish is applied. For such oil-type filler compositions to be desirable, they should possess the following characteristics: ease of application, ease of wiping within rather wide limits of time, lack of turning white in the pores (graying), lack of shrinkage, short drying time to facilitate recoating, toughness, and good adhesion to the wood surfaces.

One of the major disadvantages with the conventional oil-type wood fillers is that usually several hours are required for the fillers to dry before a top coat of lacquer or varnish can be applied. Other disadvantages of these oil-type fillers are that top or finish coats have poor adhesion to the filled surface and they often exhibit shrinkage after application (a sinking in at the pores of the wood).

An object of the present invention is to provide a novel type of wood filler that can be applied in conventional manner as by spraying or brushing and then can be wiped within a few minutes and coated over with a lacquer or other wood finish coating immediately thereafter. The use of such a wood filler obviously eliminates the usual lengthy drying period encountered in the wood filling operation. Other objects of the invention will be apparent from the description of the invention which follows hereinafter.

The novel wood fillers of this invention consist essentially of emulsions of the usual pigments, including prime and extender pigments, in a mixture of two incompatible vehicles characterized in that the incompatible vehicles do not precipitate each other on mixing to form the emulsion. One of the vehicles is preferably an oleoresinous varnish, such as China-wood oil-phenolic resin varnish or China-wood oil-maleated rosin ester varnish. The other vehicle is a convertible resin, preferably a phenolic resin, such as that obtained by condensing phenol with an excess of formaldehyde, dissolved in a volatile solvent such as alcohols, esters, ketones, and the like. Mixing of the oleoresinous varnish and the phenolic resin solution with the pigments gives an emulsified paste of uniform consistency, in which the particles of pigment appear to serve as emulsifiers, by being partially wetted by both the varnish and phenolic resin solution to prevent precipitation or separation of the components of the composition.

When the wood filler, as hereinabove described, is applied to a wood surface, the particles appear to orient themselves, as the solvent evaporates, in such a manner that the oleoresinous varnish migrates to the top surface and the phenolic resin penetrates the pores of the wood carrying the pigment particles with it. As a result, the oleoresinous varnish which rises to the surface serves as a lubricant for the wiping operation, while the pigment particles and phenolic resin remain in the pores of the wood. In the wiping operation, after wiping with a dry cloth in conventional manner, it has been found beneficial to wipe with the grain with a cloth wet with a solvent for the varnish in order to remove the last traces of the varnish.

The wood fillers prepared according to the invention dry by evaporation of solvent and hardening of the convertible resin and do not depend upon the oxidation of a drying oil as would be necessary in the drying of the conventional oil or varnish-type fillers. Consequently, by the use of our novel wood fillers in a wood finishing schedule, there is a considerable shortening of the overall finishing schedule.

Advantageously, the wood fillers of the present invention are prepared by mixing and kneading the pigments with both the varnish and the phenolic resin solution. A mutual solvent such as Cellosolve (ethyl ether of ethylene glycol), Butyl-Cellosolve (butyl ether of ethyl glycol), etc., is added to the mixture to reduce the consistency to proper workability. To facilitate application of the filler composition to a wood surface, it may be further reduced with the desired amount of volatile solvents such as alcohols, petroleum hydrocarbons, and the like, or with mixtures of these, or mixtures of these solvents with the Cellosolves, ethers and esters.

The filler composition may be further modified to give fast drying, stain filler compositions by admixing the fillers with non-grain raising stains. These non-grain raising stains generally consist of water-soluble dyes dissolved in organic solvents. The amount of such staining ingredients to be employed will necessarily depend upon the degree or shade of staining desired.

The phenolic resins used in the wood filler are preferably made by condensing phenol with excess formaldehyde in the presence of an alkaline catalyst as described in United States Patent No. 2,114,784, patented April 19, 1938. Typically, one mole of phenol and 2.5 moles of formaldehyde (as 37 per cent aqueous solution) are condensed by refluxing in the presence of a catalytic amount of sodium carbonate for 3 to 3½ hours. The alkali is then neutralized with lactic acid and the reaction mixture cut to 50 per cent solids with butyl alcohol. At this point, the water separates as a top layer and contains the soluble salts formed by the neutralization of the alkali. The non-aqueous layer, consisting of a butyl alcohol solution of the phenolic resin, is separated for use in the wood filler composition.

In the production of the wood fillers according to this invention, the phenolic resin may be mixed with other resins such as vinyl resins, and cellulose derivatives, which are soluble in solvents which will dissolve the phenol-formaldehyde resin. When such resins are used they will generally constitute less than 5 per cent of the total resin. Typically, 1 per cent of polyvinyl butyral may be added to the phenol-formaldehyde resin solution.

The following examples further illustrate the invention:

Example I

| | Parts by weight |
|---|---|
| Quartz | 40 lbs. |
| Velveteen silica | 146 lbs. |
| Carbon black | 17 oz. |
| Burnt Italian Sienna | 12 lbs., 11 oz. |
| Burnt Turkey umber | 17 lbs., ½ oz. |
| Phenolic resin vehicle | 60 lbs. |
| China-wood oil varnish | 39 lbs. |
| Butyl Cellosolve | 39 lbs. |

The above ingredients are mixed to give a thoroughly emulsified wood paste. This composition may be cut to desired spraying or brushing consistency by the addition of volatile organic solvents such as ethers, alcohols, ketones, esters or petroleum spirits.

The particular China-wood oil varnish used in the above formulation was prepared by first cooking 120 parts of maleated rosin ester (Amberol) into 94 parts of China-wood oil at a temperature of about 500° F. in the presence of about 0.2 parts of manganese acetate and cutting the cook with 40 gallons of petroleum hydrocarbon solvent (Varnolene). This varnish vehicle is then admixed with further quantities of heat bodied China-wood oil, drier and solvent to give the China-wood oil varnish used in the formulation. The proportions by volume are as follows:

| | Parts by volume |
|---|---|
| Varnish vehicle | parts 16 |
| Varnolene (petroleum hydrocarbon solvent) | do 39 |
| Heat bodied China-wood oil | do 9 |
| Drier solution | do 5 |

The drier solution was made by dissolving 466 pounds cobalt linoleate paste (Harshaw Chemical Co. Paste #42) in 58 gallons of petroleum hydrocarbon solvent (Varnolene).

Stained filler compositions can be made by incorporating one or more soluble dyes into the filler. The following example is typical.

Example II

| | |
|---|---|
| Quartz | 1 lb., 8 oz. |
| Velveteen silica | 4 lb., 8 oz. |
| Van Dyke brown | 1 lb. |
| Phenolic resin vehicle of Example I | 1 lb., 8 oz. |
| China-wood oil varnish of Example I | 1 lb. |
| Butyl Cellosolve | 1 lb. |

To this filler composition was added an equal volume of a stain composition consisting of 1.5 oz. Aniline Powder Walnut, 12 oz. Methyl Cellosolve, 84 oz. methyl alcohol, 0.125 oz. Crocein Scarlet, 1 oz. Resorcin Brown GN, 0.375 oz. Black Stain Powder B-34951 (National Aniline Division, Allied Chemical and Dye Corporation) to give a walnut stain filler composition.

Since the composition of the filler may vary considerably and depends for the most part on the user's particular needs, it will be impractical to set definite percentage limitations for all of the constituents of the composition. However, as regards the varnish and resin vehicle, we prefer to use from 1 to 2 parts by weight of resin vehicle to 1 part by weight of the varnish vehicle.

The wood fillers prepared according to our invention are faster drying than the conventional type fillers. Furthermore, they provide improved adhesion of the top or finish coat to wood surfaces without subsequent shrinkage of the final finish.

We claim:

1. A composition of matter suitable for use as a wood filler comprising pigment dispersed in a vehicle comprising an emulsion of an oleoresinous varnish and a volatile organic solvent solution of a thermosetting resin which is incompatible with the oleoresinous varnish, said emulsion being of the non-aqueous type.

2. A composition of matter suitable for use as a wood filler comprising pigment dispersed in a vehicle comprising an emulsion of an oleoresinous varnish and a volatile organic solvent solution of a thermosetting phenol-formaldehyde resin which is incompatible with the oleoresinous varnish, said emulsion being of the non-aqueous type.

3. A composition of matter suitable for use as a wood filler comprising pigment dispersed in a vehicle comprising an emulsion of an oleoresinous varnish and a volatile organic solvent solution of an alkali-condensed thermosetting phenol-formaldehyde resin which is incompatible with the oleoresinous varnish, said emulsion being of the non-aqueous type.

4. A composition of matter suitable for use as a wood filler comprising pigment dispersed in a vehicle comprising an emulsion of a China-wood oil-phenol-formaldehyde resin varnish and a volatile organic solvent solution of an alkali-condensed phenol-formaldehyde resin which is incompatible with the said varnish, said emulsion being of the non-aqueous type.

5. A composition of matter suitable for use as a wood filler comprising pigment dispersed in a vehicle comprising an emulsion of an oleoresinous varnish and a volatile organic solvent solution of an alkali-condensed phenol-formaldehyde resin which is incompatible with the oleoresinous varnish, and the volatile solvent ingredients of said emulsion containing a water-soluble dye dissolved therein, said emulsion being of the non-aqueous type.

EDWARD R. BUSH.
JOHN E. HANLE.

REFERENCES CITED

The following references are of record in the file of this patent:

UNITED STATES PATENTS

| Number | Name | Date |
|---|---|---|
| 1,037,719 | Baekeland | Sept. 3, 1912 |
| 2,194,295 | Clarke | Mar. 19, 1940 |

FOREIGN PATENTS

| Number | Country | Date |
|---|---|---|
| 555,148 | Great Britain | Aug. 6, 1943 |